United States Patent [19]

Carpenter et al.

[11] Patent Number: 4,581,889
[45] Date of Patent: Apr. 15, 1986

[54] GAS TURBINE ENGINE CONTROL

[75] Inventors: Ronald S. Carpenter, Lynn; William L. Gazzola, Manchester, both of Mass.; Frederick J. Pineo, Hampton, N.H.

[73] Assignee: General Electric Company, Cincinnati, Ohio

[21] Appl. No.: 656,567

[22] Filed: Oct. 1, 1984

[51] Int. Cl.⁴ .............................................. F02K 1/15
[52] U.S. Cl. ........................................ 60/204; 60/242
[58] Field of Search ............... 60/204, 233, 235, 242, 60/39.281, 243

[56] References Cited

U.S. PATENT DOCUMENTS

| | | | |
|---|---|---|---|
| 2,971,326 | 2/1961 | Peters et al. | 60/242 |
| 2,979,889 | 4/1961 | Hurtle et al. | 60/242 |
| 3,747,344 | 7/1973 | Porter et al. | 60/242 |
| 4,139,887 | 2/1979 | Levesque | 60/242 |
| 4,467,600 | 8/1984 | Peikert | 60/242 |

FOREIGN PATENT DOCUMENTS 812557  4/1959  United Kingdom .................. 60/242

Primary Examiner—Louis J. Casaregola
Attorney, Agent, or Firm—Gregory A. Welte; Derek P. Lawrence

[57] ABSTRACT

In one form of the present invention, the thrust of a gas turbine engine is inferred. If a droop in thrust is predicted, components of the engine are modulated in response to restore thrust.

4 Claims, 6 Drawing Figures

GAS TURBINE ENGINE CONTROL

The Government has rights in this invention pursuant to Contract No. N00019-83-C-0035 awarded by the Department of the Navy.

The present invention relates to gas turbine engine controls and, more specifically, to a type of control termed a thrust droop compensator. Such a compensator reduces the droop in thrust which sometimes occurs because of different rates of thermal growth of different engine components during engine acceleration.

BACKGROUND OF THE INVENTION

FIG. 1 illustrates a gas turbine aircraft engine as known in the art. Hot gases 3 provided by a combustor 6 impart energy to a high pressure turbine 9 which is surrounded by a shroud 12. A tip clearance 15 exists between the turbine 9 and the shroud 12. When the engine is idling, say at 11770 rpm, a given tip clearance will exist, such as 0.047 inches. However, during a sudden acceleration, such as to 16140 rpm within 4 seconds, increases in centrifugal forces due to the greater rotational speed causes the turbine to expand, thus reducing the tip clearance to 0.016 inches. Temperature in the region of the high pressure turbine 9 will increase, thus causing the turbine 9 and the shroud 12 to expand thermally. However, since the thermal mass of the shroud 12 is much less than that of the turbine 9, the shroud 12 heats up faster, and thus expands faster. Accordingly, the tip clearance 15 initially increases, say to 0.028 inches, and then decreases to the steady-state level of 0.016 inches when the temperature of the turbine 9 reaches its steady-state value.

This initial increased tip clearance 15 is undesirable because it imposes a penalty in engine efficiency: the hot gases 3 can bypass the turbine 9 by leaking through the tip clearance region 15, and thus the leaking gases do little or no work upon the turbine 9.

OBJECTS OF THE INVENTION

It is an object of the present invention to provide a new and improved gas turbine engine control.

It is a further object of the present invention to provide a new and improved gas turbine engine control which compensates for thrust droop occurring after engine acceleration.

SUMMARY OF THE INVENTION

In one form of the present invention, the thrust of a gas turbine engine is inferred. If a droop in thrust is predicted, components of the engine are modulated in response to restore thrust.

BRIEF DESCRIPTION OF THE DRAWING

FIG. 6 illustrates one form of the present invention.

DETAILED DESCRIPTION OF THE INVENTION

Figure 1:
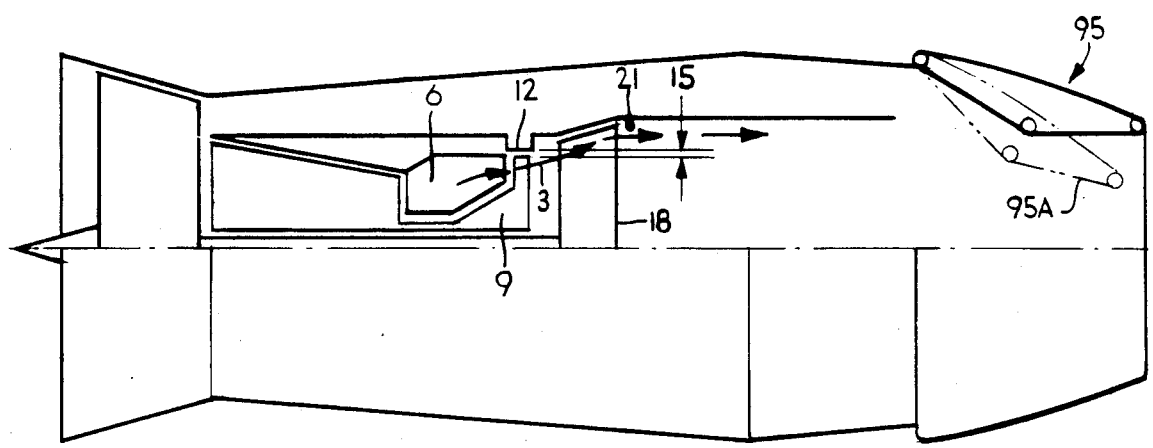
FIG. 1 illustrates a gas turbine engine.
Figure 2:
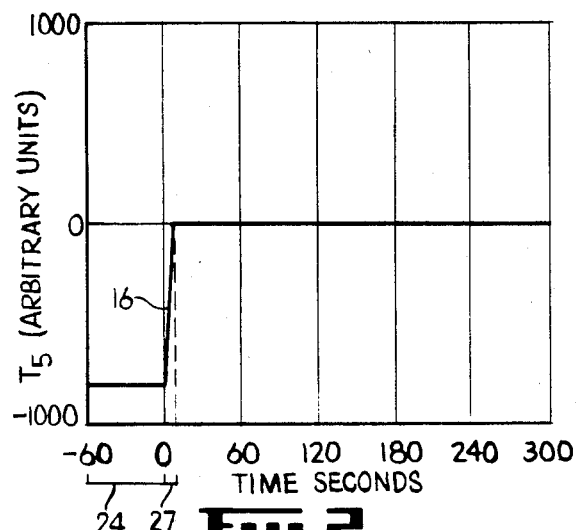
FIGS. 2–5 illustrate the changes experienced by various engine components with time during acceleration.

FIG. 2 illustrates a plot of the transient 16 of the temperature (termed T5) of the exhaust of a low pressure turbine 18 during acceleration. T5 is measured at point 21 at FIG. 1, downstream of the low pressure turbine 18. The vertical axis in FIG. 2 displays T5 in degrees F., but referenced to an arbitrary zero which is actually the maximum scheduled temperature for T5 which, in practice, is about 1500° F. During the 60 second interval 24 and earlier, the engine is operating at idle, and at time T=0, the engine is accelerated, causing T5 to rapidly increase by about 800° F. within the 4-second interval 27.

Figure 3:
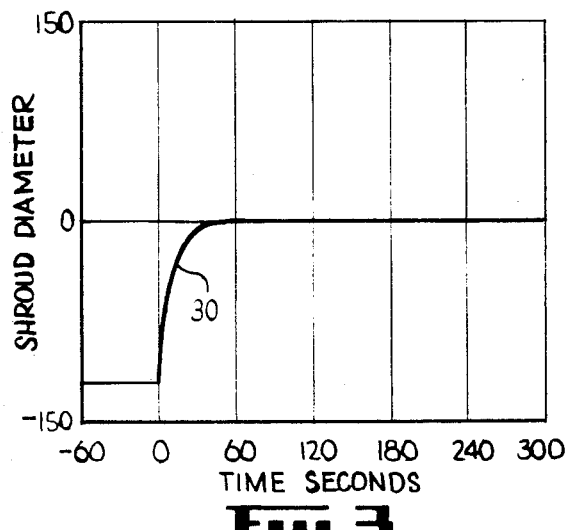
Figure 4:
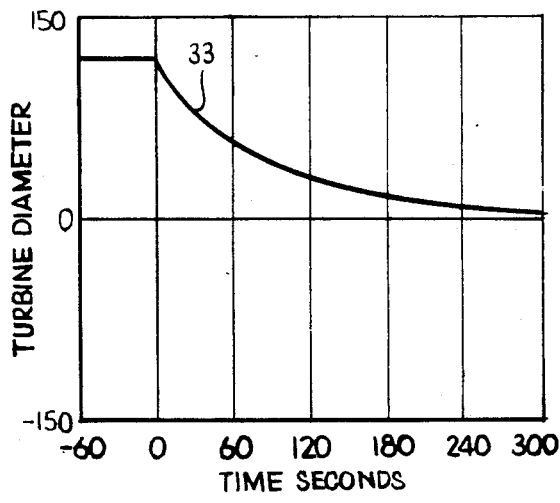
Figure 5:
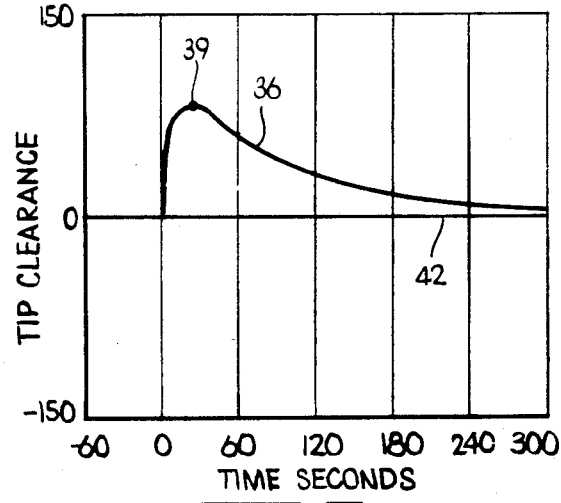
Figure 2:
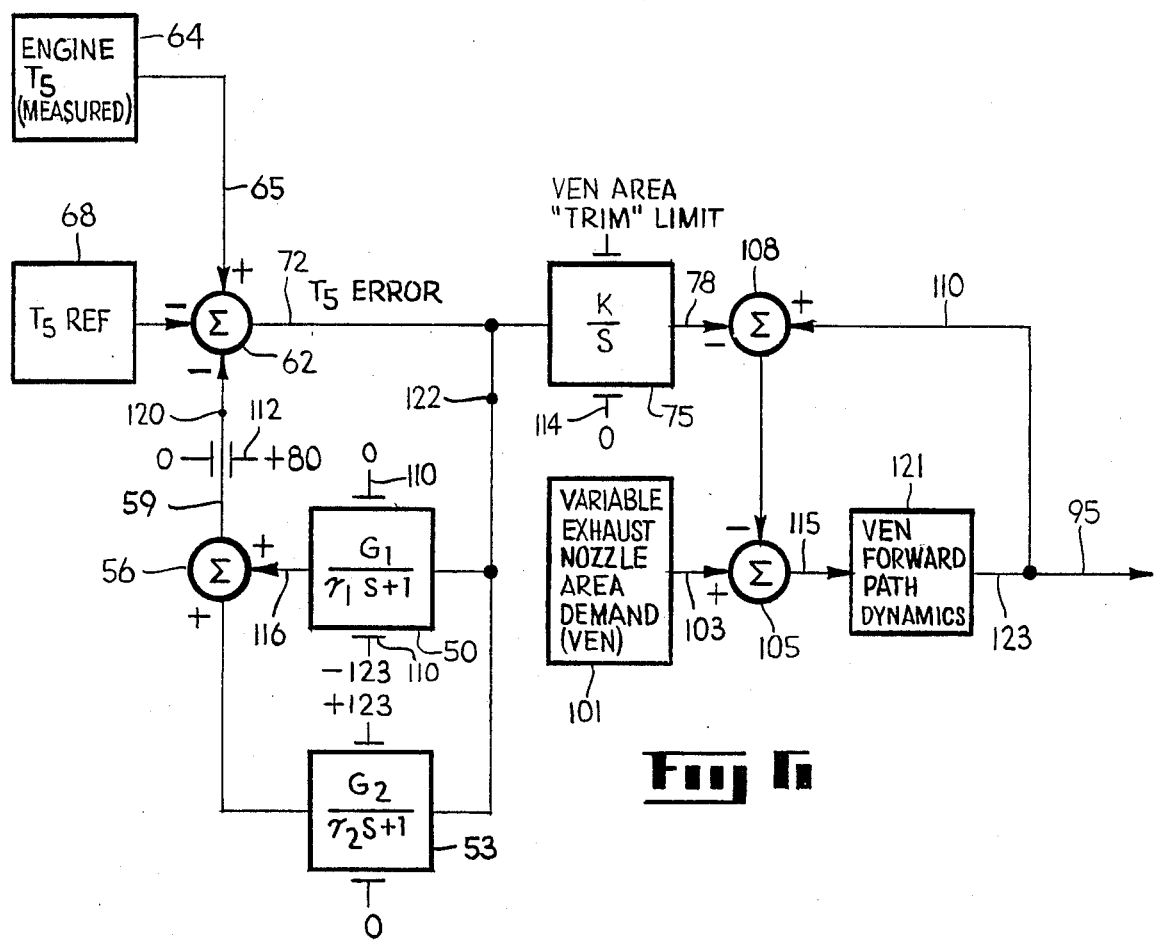

FIGS. 3–5 illustrate the effect of this rapid increase in T5 upon the temperatures of the turbine 9 and the shroud 12 of FIG. 1. FIG. 3 illustrates the transient 30 of the shroud diameter, and FIG. 4 illustrates the transient 33 of the turbine diameter, both as functions of time. The vertical axes in both these Figures are plotted in arbitrary units of diameter measure. However, even though both the turbine 9 and the shroud 12 expand upon being heated, the shroud transient is given a positive slope while the turbine transient 33 is given a negative slope. This is because the plots are referenced to the tip clearance 15 in FIG. 1, and not to absolute diameter. Since expansion of the shroud 12 in FIG. 1 causes tip clearance 15 to increase, the shroud transient 30 in FIG. 3 is ascribed a positive slope. However, since the expansion of the turbine 9 causes tip clearance 15 to decrease, the turbine transient 33 is ascribed a negative slope.

The transients of FIGS. 3 and 4 are algebraically added to produce transient 36 in FIG. 5. Transient 36 illustrates the net tip clearance 15 in FIG. 1 as a function of time during the acceleration. Again, the vertical axis in FIG. 5 is in arbitrary units indicative of clearance size. The reader will note that there is initially a peak clearance at point 39 which gradually decreases toward the steady-state value 42. As the Figure shows, it takes approximately 4 or 5 minutes for the tip clearance 15 to reach its steady-state value 42.

FIG. 6 illustrates one form of the present invention which compensates for the effect of the tip clearance transient 36 in FIG. 5 upon thrust. Block 50 in FIG. 6 generates a digital output versus time signal which is similar to the transient 30 of FIG. 3, and block 53 generates a signal similar to the transient 33 of FIG. 4. The summation in summer 56 in FIG. 6 produces a net output on line 59 similar to the transient 36 of FIG. 5. The net output is subtracted from summer 62 in FIG. 6 in which the actual, measured, T5 is added by block 64 on line 65. Also subtracted in summer 62 is a T5 reference derived from a schedule indicated by block 68. The latter block 68 is a schedule, or listing, of various values of T5 which are calculated in advance for various engine operating conditions. Thus, the value subtracted at summer 62 by block 68 will change, depending upon the operating condition of the engine.

Blocks 64 and 68 (ignoring the effect of the net output on line 59) provide on line 72 a T5 ERROR signal, in the sense that the error signal indicates a deviation of actual T5 from scheduled T5. The addition of the net output (from summer 56) on line 59 modifies the T5 ERROR signal into a T5 ERROR signal, but droop compensated (T5E-DC). T5E-DC is integrated in block 75 designated by the symbol 1/S (1/S being a/LaPlace transform term) and having a gain indicated by the term K. The output, on line 78, is a variable exhaust nozzle (VEN) area trim signal.

The VEN refers to a nozzle 95 in FIG. 1 which is modulated in area as shown by dashed nozzle 95A to modify the pressure at point 21 in the engine. This pressure modification, in a manner which need not be understood here, alters the thrust produced by the engine. Control of the modulation is accomplished by apparatus which is known in the art and outlined below. The signal provided by block 101; a VEN area demand signal on line 103, is added in summer 105. Subtracted from summer 105 is the output of summer 108 which receives as inputs a feedback signal along line 110 which is provided by a transducer (not shown) which measures the actual VEN area. The other input of summer 108 is the VEN trim signal on line 78 and it is subtracted therein. The output of summer 105, on line 115, is processed as known in the art by VEN forward path dynamics block 120, which includes digital filters to stabilize the VEN control loop and the necessary analog electric and hydromechanical components to modulate nozzle area 95 in FIGS. 1 and 6.

The operation of the circuitry shown in FIG. 6 can be described as follows. During the T5 transient 16 of FIG. 2, a signal resembling the net output plot 36 of FIG. 5 is subtracted, in FIG. 5, from summer 62 by means of line 59. This, in effect, raises the T5 reference of block 68, because both the signals from summer 56 and block 68 are applied to summer 62 with the same algebraic sign. Therefore, the T5 ERROR signal on line 72 becomes larger, so that the VEN trim signal on line 78 induces the VEN area to approach a size which will reduce the T5 ERROR, and thus increase thrust. (It has been found empirically that thrust is a function of T5, and, further, a generally linear function at intermediate thrusts, so that control of T5 is tantamount to control of thrust.)

Symbols 110, 112, and 114 indicate signal limiters, known in the art, which are considered self-explanatory. For example, limiter 110 limits the signal allowed to appear on line 116 to a range representing 0° and $-123°$ F.

The term in block 50, namely, $$\left[ \frac{G1}{\tau_1 S + 1} \right] ,$$

is a LaPlace transform. Thus, the signal processing which occurs between point 120 and point 122 can be described by the following transfer function (ignoring the action of the limiters such as limiter 110):

$$T5 = \text{COMP} = [T5 - T5\text{REF}] \left[ \frac{G1}{\tau_1 S + 1} \right] +$$

$$[T5 - T5\text{REF}] \left[ \frac{G2}{\tau_2 S + 2} \right]$$

wherein T5COMP is the signal generated on line 59.

An invention has been described wherein a droop in thrust occurring during acceleration of a gas turbine engine is compensated. The droop is caused by the transient increase in tip clearance between the high pressure turbine and the shroud surrounding it. The clearance transient is caused by the differential thermal growth of the turbine as opposed to the shroud. The present invention increases engine thrust, as by manipulating parameters such as exhaust nozzle area and fuel flow, as a function of tip clearance in order to compensate for the loss induced by the clearance transient.

One important aspect of the invention is that the general shapes of the signals produced by blocks 50 and 53 in FIG. 6 are predetermined. That is, the signals decay with predetermined time constants as do the signals shown in FIGS. 3 and 4. However, the initial magnitudes of the signals produced by these blocks is a function of the signal present on line 122 in FIG. 6. In this sense, the signals produced by blocks 50 and 53 are produced according to predetermined functions: the decay times (dictated by the time constants in blocks 50 and 53) are predetermined, but the initial magnitudes are dictated by T5 ERROR.

Numerous modifications and substitutions can be undertaken without departing from the true spirit and scope of the present invention. For example, one embodiment has been tested in which the following variables were given the following values:

$$\tau_1 = 10 * \left( \frac{8583}{WFMC} \right)^{0.5}$$

$$\tau_2 = 85 * \left( \frac{8583}{WFMC} \right)^{0.5}$$

wherein the term WFMC refers to the fuel flow (in pounds per hour), but corrected for the sea level static fuel requirement at intermediate power. Making the time constants $\tau_1$ and $\tau_2$ variable in this manner corrects for the effect of Reynolds number on heat transfer to the turbine disk 9 in FIG. 1 and shroud 12 in FIG. 1.

However, it is to be recognized that it will be known to those skilled in the art that controls for different engines using the concept of the present invention will almost certainly require different values for these variables. The values for a different engine can be calculated from the FIG. 5 type of transient which corresponds to that engine. The time constants, $\tau_1$ and $\tau_2$, are calculated from the time constants of the plots of FIGS. 3 and 4, and the gains G, are calculated, as known in the art, to give proper magnitude to the signal appearing on line 59 in FIG. 6.

What is desired to be secured by Letters Patent of the United States is the invention as defined in following claims.

We claim:

1. A gas turbine engine control comprising:
   (a) temperature error means for deriving an error signal, T5 ERROR, indicative of the deviation of the temperature of an engine component from a reference temperature;
   (b) variable exhaust nozzle (VEN) means for modifying the area of the exhaust nozzle of the engine as a function of T5 ERROR; and
   (c) T5 ERROR compensation means for modifying T5 ERROR such that T5 ERROR first increases then decreases to thereby induce the VEN means to first decrease and then increase the nozzle area.

2. In a gas turbine engine control which modulates a variable exhaust nozzle as a function of parameters which include a temperature error signal, T5 ERROR, derived from comparison of the temperature of a component of the engine with a reference schedule of temperatures, the improvement comprising:
   (a) first modification means for modifying T5 ERROR;
   (b) second modification means for modifying T5 ERROR such that the combined effect of the first and second modification means is to initially increase T5 ERROR according to a predetermined time constant and then to decrease T5 ERROR according to a predetermined second time constant.

3. In a control according to claim 2 in which
(a) the first modification means modifies T5 ERROR substantially according to the following LaPlace transform:

$$\frac{G1}{\tau_1 S + 1}$$

(b) the second modification means modifies T5 ERROR substantially according to the following LaPlace transform:

$$\frac{G2}{\tau_2 S + 1}$$

in which $\tau_2 > \tau_1$.

4. A method of compensating for the droop in thrust which occurs in a gas turbine engine upon acceleration, comprising the following steps:
(a) inferring the occurrence of droop from a change in the temperature of the low pressure turbine exhaust T5;
(b) increasing and then decreasing the difference between T5 and a reference to produce a compensated temperature signal, T5 COMP; and
(c) modulating the exhaust nozzle area of the engine as a function of T5 COMP.

* * * * *